(12) United States Patent
Lahoda et al.

(10) Patent No.: US 12,412,672 B2
(45) Date of Patent: Sep. 9, 2025

(54) FUEL ROD HAVING HEAT TRANSFER LIQUID FILLING THE GAP BETWEEN FUEL PELLETS AND CLADDING TUBE

(71) Applicant: Westinghouse Electric Company LLC, Cranberry Township, PA (US)

(72) Inventors: Edward J. Lahoda, Edgewood, PA (US); Peng Xu, Columbia, SC (US); Lu Cai, Columbia, SC (US); Yun Long, Allison Park, PA (US); John Lyons, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 354 days.

(21) Appl. No.: 17/593,037

(22) PCT Filed: Mar. 5, 2020

(86) PCT No.: PCT/US2020/021154
§ 371 (c)(1),
(2) Date: Sep. 6, 2021

(87) PCT Pub. No.: WO2020/185502
PCT Pub. Date: Sep. 17, 2020

(65) Prior Publication Data
US 2022/0084694 A1    Mar. 17, 2022

Related U.S. Application Data

(60) Provisional application No. 62/814,943, filed on Mar. 7, 2019.

(51) Int. Cl.
G21C 3/20    (2006.01)
G21C 3/07    (2006.01)
G21C 3/18    (2006.01)

(52) U.S. Cl.
CPC ............... *G21C 3/20* (2013.01); *G21C 3/07* (2013.01); *G21C 3/18* (2013.01)

(58) Field of Classification Search
CPC ............. G21C 3/20; G21C 3/07; G21C 3/18
(Continued)

(56) References Cited

U.S. PATENT DOCUMENTS 3,119,747 A * 1/1964 Wallace ............... G21C 3/20
376/423
10,734,121 B2    8/2020 Pomirleanu et al.
(Continued)

FOREIGN PATENT DOCUMENTS

CH    320931 A    5/1957
CN    103295652 B    2/2017
(Continued)

OTHER PUBLICATIONS

Mishchenko, "Composite UN-UO2 fuels", 2018. (Year: 2018).*
(Continued)

*Primary Examiner* — Jack W Keith
*Assistant Examiner* — Daniel Wasil
(74) *Attorney, Agent, or Firm* — K&L Gates LLP

(57) ABSTRACT

An improvement in a nuclear fuel rod is disclosed. The improved fuel rod includes a cladding tube, a plurality of fuel pellets stacked within the cladding tube, and a liquid material filling the gap between the fuel pellets and the cladding tube. The liquid material is selected from those having a thermal conductivity higher than that of helium, a melting point lower than about 400° C., a boiling point higher than 1600° C., and which are capable of wetting both the fuel pellets and the cladding sufficient to form a protective layer over the pellets and to wick into openings that may form in the cladding.

10 Claims, 1 Drawing Sheet

(58) Field of Classification Search
USPC .................................................. 376/412, 424
See application file for complete search history.

(56) References Cited

U.S. PATENT DOCUMENTS

| | | |
|---|---|---|
| 2013/0208848 A1 | 8/2013 | Zabiego et al. |
| 2016/0049211 A1* | 2/2016 | Feinroth .................. G21C 3/07 376/416 |

FOREIGN PATENT DOCUMENTS

| | | |
|---|---|---|
| JP | 11202072 A * | 7/1999 |
| JP | H11-183674 A | 7/1999 |
| JP | H11-326571 A | 11/1999 |
| JP | 2016-176961 A | 10/2016 |
| JP | 2017515094 A | 6/2017 |
| SE | 320931 B | 2/1970 |
| WO | 2020185502 A2 | 9/2020 |

OTHER PUBLICATIONS

Adorno, "Compatibility Of U3Si2 Fuel With Zr, FeCrAl and SiC/SiC Based Cladding", No. LLNL-TR-763871; NU-16-SC-USC_020101-01, Lawrence Livermore National Lab (United States) 2018. (Year: 2018).*

Wood, "Improved CANDU fuel performance. A summary of previous AECL publications", No. IWGFPT--5. 1980. (Year: 1980).*

International Search Report and Written Opinion for International PCT Application No. PCT/US2020/021154, dated Sep. 10, 2020.

\* cited by examiner

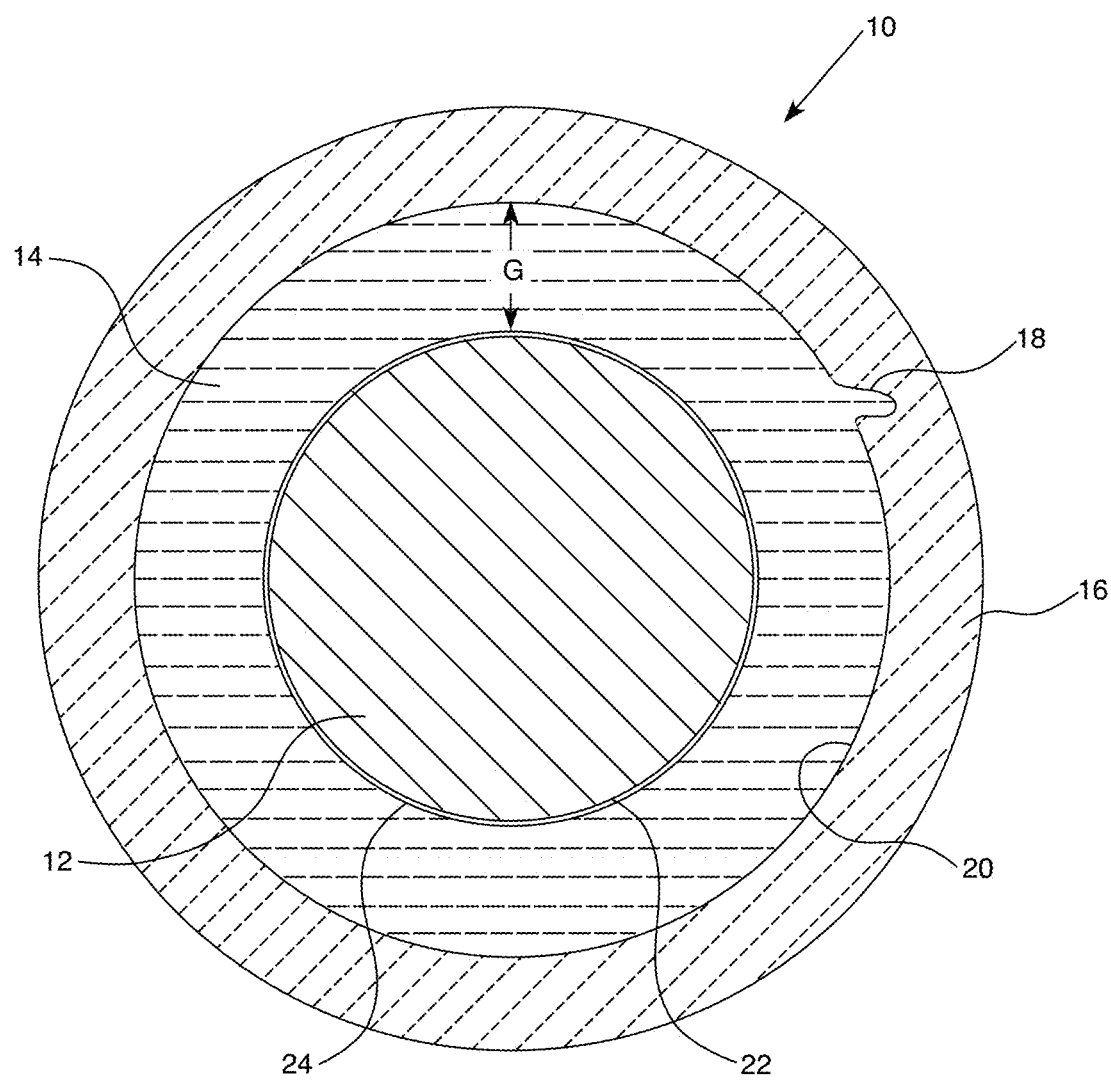

FUEL ROD HAVING HEAT TRANSFER LIQUID FILLING THE GAP BETWEEN FUEL PELLETS AND CLADDING TUBE

CROSS-REFERENCE TO RELATED APPLICATIONS

This application is a U.S. National Stage Entry under 35 U.S.C. § 371 of International Patent Application No. PCT/US2020/021154, entitled SELF-HEALING LIQUID PELLET-CLADDING GAP HEAT TRANSFER FILLER, filed Mar. 5, 2020, which claims benefit under 35 U.S.C. § 119(e) to U.S. Provisional Patent Application No. 62/814,943, filed on Mar. 7, 2019, the entire disclosures of which are hereby incorporated by reference herein.

STATEMENT REGARDING GOVERNMENT RIGHTS

This invention was made with government support under Contract No. DE-NE0008824 awarded by the Department of Energy. The government has certain rights in the invention.

BACKGROUND OF THE INVENTION

Field of the Invention

The invention relates to nuclear fuel rods, and more particularly to fuel rods with liquid materials between the solid fuel and the solid cladding surrounding the fuel.

Description of the Prior Art

In a typical nuclear reactor, the reactor core includes a large number of fuel assemblies, each of which is composed of a plurality of elongated fuel rods. The fuel rods each contain nuclear fuel fissile material, such as at least one of uranium dioxide ($UO_2$), plutonium dioxide ($PuO_2$), uranium nitride (UN), and/or uranium silicide ($U_3Si_2$), usually in the form of a stack of nuclear fuel pellets surrounded by a gas, such as helium (He) or hydrogen ($H_2$). Fuel rods are encased in a cladding that acts as a containment for the fissile material. In a reactor, fuel rods are grouped together in an array which is organized to provide a neutron flux in the core sufficient to support a high rate of nuclear fission and the release of a large amount of energy in the form of heat. A coolant, such as water, is pumped through the core to extract the heat for useful work. There are challenges with nuclear fuels and claddings.

SUMMARY OF THE INVENTION

A solution to the challenges presented by certain combinations of nuclear fuels and claddings is provided by the improved fuel rod design described herein, and in particular, the use of certain liquid materials to fill the gap between the fuel pellets and the cladding.

In a nuclear fuel rod comprising a cladding tube, at least one, and in various aspects, a plurality of fuel pellets stacked within the cladding tube, and a radial gap defined between the fuel pellets and the cladding tube, an improvement includes a liquid material for filling the gap between the fuel pellets and the cladding tube. The liquid material has a thermal conductivity higher than that of helium, a melting point lower than about 400° C., and a boiling point higher than 1600° C., and is capable of wetting both the cladding and the fuel pellets sufficient to wick into cracks, if present, in the cladding and to form a protective layer over the pellets.

The liquid material in various aspects, may be selected from the group consisting of lead-based alloys and tin-based alloys and metals of tin, zinc, lead and bismuth. Exemplary alloys include Pb—Sn—Bi and Pb—Bi systems, Li—Be fluoride, and eutectic alloys that include 10 to 18 atom % Zn with residual Sn. Exemplary lead-based alloys may be selected the group consisting of Pb—Sn—Bi and Pb—Bi systems. Exemplary tin-based alloys may be selected from the group consisting of Sn—Zn or Sn.

The cladding tube may be made from silicon carbide, such as a silicon carbide composite material. In various aspects, the fuel may be selected from the group consisting of $UO_2$, UN, $U_3Si_2$, and combinations thereof.

The nuclear fuel rod may be used in any type of reactor having fuel rods. In various aspects, the nuclear fuel rod may be used in light water reactors, such as a boiling water reactor or a pressurized water reactor, CANDU-style reactors, molten salt reactors, or fast reactors. If the reactor is a boiling water reactor, the liquid material may be a lead-based alloy, such as Pb—Sn—Bi or Pb—Bi systems.

BRIEF DESCRIPTION OF THE DRAWINGS

The characteristics and advantages of the present disclosure may be better understood by reference to the accompanying FIGURE.

The accompanying FIGURE is a schematic representation of a cross-section of a SiC fuel rod, showing micro-cracks in the cladding occurring from the inside and liquid materials filling the cracks to prevent leakage through the cladding to the coolant surrounding the fuel rod.

DESCRIPTION OF THE PREFERRED EMBODIMENTS

As used herein, the singular form of "a", "an", and "the" include the plural references unless the context clearly dictates otherwise. Thus, the articles "a" and "an" are used herein to refer to one or to more than one (i.e., to at least one) of the grammatical object of the article. By way of example, "an element" means one element or more than one element.

In the present application, including the claims, other than where otherwise indicated, all numbers expressing quantities, values or characteristics are to be understood as being modified in all instances by the term "about." Thus, numbers may be read as if preceded by the word "about" even though the term "about" may not expressly appear with the number. Accordingly, unless indicated to the contrary, any numerical parameters set forth in the following description may vary depending on the desired properties one seeks to obtain in the compositions and methods according to the present disclosure. At the very least, and not as an attempt to limit the application of the doctrine of equivalents to the scope of the claims, each numerical parameter described in the present description should at least be construed in light of the number of reported significant digits and by applying ordinary rounding techniques.

Further, any numerical range recited herein is intended to include all sub-ranges subsumed therein. For example, a range of "1 to 10" is intended to include any and all sub-ranges between (and including) the recited minimum value of 1 and the recited maximum value of 10, that is, having a minimum value equal to or greater than 1 and a maximum value of equal to or less than 10.

"Wetting" as used herein means reducing the surface tension such that a liquid can spread across or penetrate more easily the surface of a solid.

A "eutectic alloy" as used herein means a homogeneous mixture of at least one metal and at least one other substances, which may be a second metal, wherein the metal and the other substance melt or solidify at a single temperature that is lower than the melting point of either of the constituents. The eutectic temperature is the lowest possible melting temperature over all of the mixing ratios for the involved component species. Eutectic alloys have two or more materials and have a eutectic composition. When a eutectic alloy melts, it does so at a single, sharp temperature, as opposed to a non-eutectic alloy, whose components solidify at different temperatures, exhibiting a plastic melting range.

Efforts to enhance the safety and performance of nuclear reactors is behind research into improved cladding materials and fuels. SiC and SiC composites are a very promising accident tolerant fuel claddings. Experimental ceramic type materials such as SiC monolith, fibers and their combinations are taught in U.S. Pat. Nos. 6,246,740; 5,391,428; 5,338,576; 5,182,077, and U.S. Patent Application Publications 2006/0039524, 2007/0189952; and 2015/0078505, the relevant portions of which are incorporated herein by reference.

One of the main challenges in using SiC as a cladding for a nuclear fuel rod is that the fuel pellets cannot be allowed to exert a mechanical strain on the SiC cladding. Because SiC claddings are not pliable like metal-based claddings, the SiC cladding will lose its hermeticity if it is subjected to a strain greater than or equal to about 0.05%. In ceramic cladding, micro-cracks may form due to thermal and mechanical stresses, while in metal claddings, abrasion due to debris or wear can cause pinholes.

$UO_2$ is an excellent fuel but its low thermal conductivity will cause high pellet temperatures which in turn cause excessive thermal expansion of the pellet and during a power transient can cause centerline melting of the pellet. Fission products, such as isotopes of cesium and strontium, have a lower density than the original uranium fuel, will cause swelling of the fuel pellet which, unless the pellet-cladding gap is wide enough, will cause the cladding to crack. Increasing the pellet-cladding gap has consequence of increased fuel temperature and fission gas release due to low thermal conductivity of helium gas gap and can significantly reduce fuel melt and rod internal pressure margin. Therefore, employing $UO_2$ with SiC cladding using helium to fill the gap may not be feasible.

$U_3Si_2$ and UN, on the other hand, have very high thermal conductivities so that they don't swell much and can avoid contact between the pellet and the cladding. The gap between the pellet and the cladding can be made relatively wide while still avoiding center-line melting of the pellet. One drawback in using $U_3Si_2$ and UN fuels, however, is the poor water corrosion resistance of these two materials, which can make their use in light water reactors problematic. In the event of a leak, the $U_3Si_2$ and UN pellets will react with water to produce $UO_2$ and $U_3O_8$ causing the pellets to swell and break the cladding.

In the 1980s, in fast reactors having sodium-based coolants, stainless steel cladding, uranium fuels, large gaps between the pellet and the cladding to accommodate the excessive swelling of the fuel pellets, and a sodium metal liquid to fill the gap were reported. Sodium, however, reacts, often violently, with water, so the approach attempted in fast reactors is not feasible in light water reactors where, in the event of even a small leak event, contact between water from the coolant and the sodium-based liquid metal in the gap would generate excessive heat and lead possible to a centerline fuel melt. Additionally, increasing the radial gap size decreases thermal conductivity in the gap, leading to increased centerline heat in the fuel pellet. Metal fillers such as lead have been prohibited because of corrosion issues with high nickel alloys in fast reactors.

In current fuel rods of water reactors, helium fills the gap between the $UO_2$ pellet stack and zirconium-based cladding. At the beginning of the reactor fuel's useful life, about 35% of the thermal resistance is through the helium filled gap. Because of the combined low thermal conductivity of $UO_2$ and the low thermal conductivity of the helium in the gap, thermal expansion of the pellet occurs. In addition, fission products generated from the fuel cause the $UO_2$ pellets to swell, closing the size, or depth of the gap as the fuel is used in the reactor.

Alternative fuels like $U_3Si_2$ and UN are proposed for SiC clad. However, both fuels have poor water corrosion resistance. When a leaker occurs, the fuel rod may be ballooned in the case of a metal cladding or broken in the case of a ceramic cladding (SiC for example) by the volume increase caused by oxidation of $U_3Si_2$ to $UO_2/U_3O_8$, which will then block the coolant path.

As a very promising accident tolerant cladding, the challenges of implementing SiC are that for SiC cladding to work with $UO_2$ as the reactor fuel, high thermal conductivity and reduction in stored energy in the fuel are needed. For SiC cladding to work with $U_3Si_2$ or UN as the fuel in light water reactors, a protective layer on the fuel pellets is necessary to prevent, or at least delay, the contact of $U_3Si_2$ and UN fuels with steam or coolant during a leak event.

A solution to the aforementioned challenges can be provided by enabling a self-healing mechanism to take place within a cladding tube during operation to prevent one or both of coolant and steam that may be introduced into the cladding due to micro-cracks that form in a cladding tube from reacting with the pellets. By replacing helium or other gases that are currently used to surround the fuel pellets within a cladding tube with a liquid material to fill the gap between the fuel pellet and the cladding, the liquid material will flow into any cracks, micro-cracks, crevices, deformations, voids, pinholes or other openings that have the potential to form a pathway through the cladding to the coolant (collectively or individually referred to herein as "cracks") that form in the claddings.

Referring to the FIGURE, the schematic representation of a cross-section of a fuel rod 10 shows a fuel pellet 12 centrally positioned within a cladding tube 16. A radial gap, G, separates the inner surface 20 of the cladding tube 16 and the outer surface 22 of the fuel pellet 12. An exemplary crack 18 is shown extending from an opening in the inner surface 22 into the body of the cladding tube 16. A liquid material 14 fills the gap, G, and enters the opening in the inner cladding 20 to fill the crack 18. A protective layer 24 may form to cover the exterior of the fuel pellet 12. Although not shown for the sake of simplicity, those skilled in the art will understand that there may be multiple cracks 18 formed in the cladding 16 during use. The liquid material 14 will flow into and fill each such crack that forms on the inner surface 20 of the cladding. If a crack forms from the exterior of the cladding 16 and eventually reaches the interior of the cladding, the liquid material will react with steam to form a solid protective oxide layer 24 over the exterior of pellet 12. Layer 24 is shown in the FIGURE for illustrative purposes, but those skilled in the art will appreciate that in various aspects, the layer 24 will not form unless a reaction with the coolant has occurred.

The cladding tube 16 in various aspects may be made of a SiC composite. SiC composites are frequently in the form of wrappings or braidings of SiC fibers over a mandrel or SiC tube to form the fuel rod cladding. Continuous SiC fiber-reinforced SiC matrix composites are disclosed in U.S. Patent Application Publication 2015/0078505 or Y. Katoh et al., "Continuous SiC fiber, CVI SiC matrix composites for nuclear applications: Properties and irradiation effects," *Journal of Nuclear Materials*, vol. 448, pp. 448-476 (2014). Commercial sources of SiC fibers are Hi-Nicalon™ Type S fibers (manufactured by Nippon Carbon, Tokyo, Japan) and Tyranno™ SA3 fibers (manufactured by Ube Industry, Ube, Japan), both of which are listed in Table 1 of Y. Katoh et al., *Journal of Nuclear Materials*, vol. 448 at 450.

The pellet 12 in various aspects may be a uranium pellet, such as $UO_2$. Alternatively, the fuel pellet 12 may be UN or $U_3Si_2$.

In certain aspects, the liquid material is liquid within a temperature range from 315° C. to 1600° C., and in certain aspects within a temperature range from 400° C. to 1600° C. The liquid material 14 may have a melting point lower than about 400° C. and a boiling point higher than 1600° C. The liquid material 14 is capable of wetting both the fuel pellets 12 and the cladding 16 to a sufficient degree to form a protective layer 24 over the pellets 12 and to wick into cracks 18, if present, in the cladding 16.

In various aspects described herein, liquid materials 14 with high thermal conductivity are used to fill the gap, G, between the exterior 22 of pellet 12 and the interior surface 20 of cladding 16 to enable the compatibility of different uranium-based fuels with SiC based cladding and while particularly useful in light water reactors, may be used in any nuclear reactor having fuel rods. When the cladding 16 is made of SiC or a SiC composite, a liquid material 14 filling the gap will make $UO_2$ compatible with the SiC by reducing the thermal resistance in the gap and then decreasing the thermal expansion of the fuel as well as reducing the chance for centerline melting of the $UO_2$ fuel during thermal excursions.

In various aspects, the liquid material 14 will act as a protective layer and, in the event of a leak event, the liquid 14 will react with steam to form a solid protective oxide layer 24 over the exterior 22 of pellet 12 to prevent steam from contacting the pellet 12. The liquid material will also fill in cracks 18 in the cladding 16 and, again, in the event of a leak event, will react with any water that comes through a crack to form a plug for the crack or form a protective layer over one or both of the fuel pellet 12 and the cladding interior 20 when in contact with coolant.

Liquid materials 14 may be selected from low melting temperature metals or a eutectic metal alloy. In various aspects, the liquid material preferably has the following characteristics.

1. A melting point lower than ~400° C. during operation.
2. A boiling point higher than 1600° C. to avoid the increase of the rod internal pressure in case of transients or beyond design basis accidents.
3. Can form a self-healing micro-crack plug in SiC cladding.
4. By solidification around the fuel, can protect $U_3Si_2$ and UN from water and steam corrosion as well as the release of fission products.
5. It can in certain aspects, solidify at the coolant temperature. The melting temperature is slightly higher than typical coolant temperature (~315° C.), so that the liquid metal or alloy can fill in the SiC cracks and solidify when contacting coolant.
6. The liquid filler material should wet both the fuel pellet and cladding such that it will wick into cracks 18.

Exemplary liquid materials 14 include, but are not limited to, Pb-based alloys (only for boiling water reactors), tin-based alloys, zinc-based eutectic alloys, and metals of tin, zinc, lead and bismuth. Exemplary lead-based alloys include Pb—Sn—Bi and Pb—Bi systems. Exemplary tin-based alloys include Sn—Zn or Sn. Exemplary zinc-based eutectic alloys include 10 to 18 atom % Zn with residual Sn (Melting point=200° C.).

Pb-based alloys, such as Pb—Sn—Bi and Pb—Bi systems may be suitable for use in boiling water reactors. However, lead-based alloys are not an optimum choice in the environment of pressurized water reactors. The limit for lead in coolant is 10 ppb per Electric Power Research Institute guideline because lead can corrode steam generator tubes.

The liquid material 14 filling the pellet-cladding gap, G, enables use of a wider choice of fuels. For example, if the fuel of choice is $UO_2$, use of a liquid material 14 to fill the gap, G, will decrease the temperature of the fuel which in turn will reduce the thermal expansion and the risk of centerline melt of the fuel, have a higher thermal conductivity than that of helium thereby enabling a larger gap design to avoid contact between the pellet 12 and cladding 16, reduce the fuel temperature, and reduce fission gas release. Reduction of fission gas release will allow higher $U_{235}$ enrichments and longer fuel lifetimes since the rod internal pressure will be reduced and remain below that of the coolant for longer fuel burnups.

When the fuel of choice is $U_3Si_2$ or UN, use of a liquid material 14 to fill the gap, G, is expected to provide a protective layer to prevent, or at least delay, contact with steam, making them compatible fuels for water reactors, and will fill any internal cladding cracks to allow the cladding to "self-heal" If a crack develops in the exterior of the cladding. The liquid material 14 can fill in the cracks 18 and after reaction with water fill in the crack. This "self-heal" mechanism prevents further leakage events.

The improved fuel rod design described herein increases the compatibility of SiC cladding with $UO_2$, UN, and $U_3Si_2$, and particularly in light water reactors. The improved design also mitigates and may prevent the leaking mechanism of SiC composite and Cr coated zirconium claddings.

The following benefits would be realized by using a liquid material 14 as described herein to fill the gap, G, between the fuel pellet 12 and a SiC based cladding 16:

1. increasing thermal conductivity in the gap;
2. allowing a wide gap (e.g., up to 0.1 mm) that can be used to guarantee no pellet-cladding mechanical contact due to fission product buildup in the pellet while decreasing thermal expansion of fuel pellet so that $UO_2$ fuel can work in SiC based claddings;
3. reducing fission gas release because the fuel temperature is lower;
4. protecting $U_3Si_2$ and UN fuels from steam allowing them to be used in light water reactor applications directly without modification; and
5. filling micro-cracks in SiC cladding and Cr coated Zr alloy and Zr alloy cladding and reacting with water to form an insoluble plug in the crack to mitigate leaks in SiC and Cr coated Zr alloy and Zr alloy cladding.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present invention has been described with reference to various exemplary and illustrative embodiments. The embodiments described herein are understood as providing illustrative features of varying detail of various embodiments of the disclosed invention; and therefore, unless otherwise specified, it is to be understood that, to the extent possible, one or more features, elements, components, constituents, ingredients, structures, modules, and/or aspects of the disclosed embodiments may be combined, separated, interchanged, and/or rearranged with or relative to one or more other features, elements, components, constituents, ingredients, structures, modules, and/or aspects of the disclosed embodiments without departing from the scope of the disclosed invention. Accordingly, it will be recognized by persons having ordinary skill in the art that various substitutions, modifications or combinations of any of the exemplary embodiments may be made without departing from the scope of the invention. In addition, persons skilled in the art will recognize, or be able to ascertain using no more than routine experimentation, many equivalents to the various embodiments of the invention described herein upon review of this specification. Thus, the invention is not limited by the description of the various embodiments, but rather by the claims.

What is claimed is:

1. A nuclear fuel rod, comprising:
   a silicon carbide cladding tube;
   a plurality of fuel pellets stacked within the cladding tube, wherein the fuel pellets are selected from the group consisting of $UO_2$, UN, $U_3Si_2$, and combinations thereof; and
   a Sn—Zn alloy filling a gap between the fuel pellets and the cladding tube such that the Sn—Zn alloy is in direct contact with the silicon carbide cladding tube and the fuel pellets, the Sn—Zn alloy having a thermal conductivity higher than that of helium gas, a melting point above 315° C. and lower than 400° C., a boiling point higher than 1600° C., the Sn—Zn alloy capable of wetting both the silicon carbide cladding tube and the fuel pellets sufficient to wick into a crack in the cladding, the Sn—Zn alloy forming a solid protective layer over the pellets based on coolant contacting the Sn—Zn alloy via the crack, and the Sn—Zn alloy forming a plug within the crack based on coolant contacting the Sn—Zn alloy via the crack.

2. The nuclear fuel rod of claim 1 wherein the Sn—Zn alloy is selected from the group consisting of tin-based alloys, and zinc-based alloys.

3. The nuclear fuel rod of claim 2 wherein the Sn—Zn alloy is a zinc-based alloy.

4. A nuclear fuel rod, comprising:
   a silicon carbide cladding tube;
   a plurality of fuel pellets stacked within the cladding tube, wherein the fuel pellets comprise uranium-based fuel pellets; and
   a Sn—Zn alloy filling a gap between the fuel pellets and the cladding tube such that the Sn—Zn alloy is in direct contact with the silicon carbide cladding tube and the fuel pellets, the Sn—Zn alloy having a thermal conductivity higher than that of helium gas, a melting point below 315° C., a boiling point higher than 1600° C., the Sn—Zn alloy is capable of wetting both the cladding and the fuel pellets sufficient to wick into a crack in the cladding and to form a layer over the pellets, wherein the Sn—Zn alloy wetting the cladding and the fuel pellets is configured to react with coolant to form a solid layer over the pellets based on the coolant contacting the Sn—Zn alloy via the crack in the cladding.

5. The nuclear fuel rod of claim 4, wherein the Sn—Zn alloy comprises a eutectic alloy.

6. The nuclear fuel rod of claim 5, wherein the eutectic alloy has a melting point corresponding to the eutectic temperature.

7. The nuclear fuel rod of claim 4, wherein the uranium-based fuel pellets comprise $UO_2$ fuel pellets.

8. The nuclear fuel rod of claim 4, wherein the uranium-based fuel pellets comprise UN fuel pellets.

9. The nuclear fuel rod of claim 4, wherein the uranium-based fuel pellets comprise $U_3Si_2$ fuel pellets.

10. The nuclear fuel rod of claim 4, wherein the gap between the fuel pellets and the cladding tube is up to 0.1 mm.

* * * * *